United States Patent
Dearing

(10) Patent No.: US 11,468,665 B2
(45) Date of Patent: Oct. 11, 2022

(54) AUTOMATED MEASUREMENT UTILITY

(71) Applicant: United States Postal Service, Washington, DC (US)

(72) Inventor: Stephen M. Dearing, Herndon, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 17/002,608

(22) Filed: Aug. 25, 2020

(65) Prior Publication Data

US 2021/0064868 A1 Mar. 4, 2021

Related U.S. Application Data

(60) Provisional application No. 62/891,625, filed on Aug. 26, 2019.

(51) Int. Cl.
*G06V 20/00* (2022.01)
*G06T 7/62* (2017.01)
*G01B 11/06* (2006.01)

(52) U.S. Cl.
CPC .......... *G06V 20/00* (2022.01); *G01B 11/0608* (2013.01); *G06T 7/62* (2017.01); *G06T 2207/30242* (2013.01)

(58) Field of Classification Search
CPC .................. G06K 9/00624; G06T 7/62; G06T 2207/30242; G01B 11/0608
USPC .......................................................... 382/103
See application file for complete search history.

(56) References Cited

U.S. PATENT DOCUMENTS

| | | | |
|---|---|---|---|
| 10,339,656 B1* | 7/2019 | Le | G06T 7/50 |
| 2003/0136698 A1* | 7/2003 | Klatt | B65D 83/08 206/532 |
| 2016/0379076 A1* | 12/2016 | Nobuoka | G06K 7/10722 382/103 |
| 2020/0043192 A1* | 2/2020 | Zhang | G06K 9/4609 |
| 2020/0327653 A1* | 10/2020 | Leordeanu | G06T 3/4038 |

\* cited by examiner

*Primary Examiner* — Michael R Neff
(74) *Attorney, Agent, or Firm* — Knobbe Martens Olson & Bear LLP

(57) ABSTRACT

Systems and methods for an automated measurement utility are disclosed. Image analysis is used to determine a quantity of items in a stack of items. The quantity of items can be determined further based on item information and location awareness information. The quantity of items can be used to determine resource requirements, predictive workloads, and to improve item processing operations.

17 Claims, 4 Drawing Sheets

AUTOMATED MEASUREMENT UTILITY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Patent Application No. 62/891,625, filed Aug. 26, 2019, the entire contents of which are hereby incorporated by reference.

BACKGROUND

This disclosure relates to automated measurement utilities for determining item quantities and volume in an item distribution network.

SUMMARY

Figure 1:
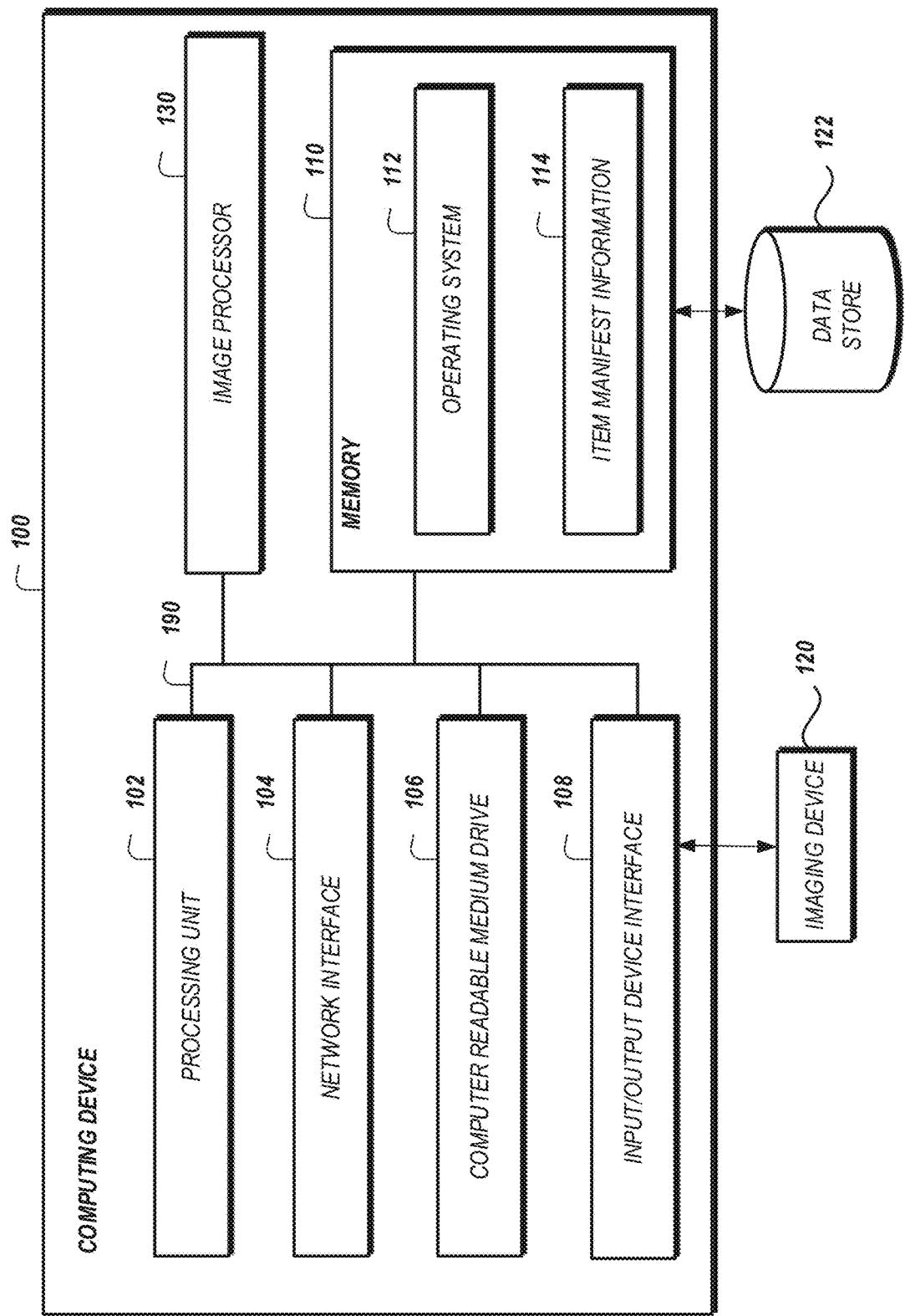
FIG. 1 depicts a block diagram of an exemplary system for an automated measurement utility.

In one aspect described herein, a system for automatically determining item quantity comprises an item container, an imaging system positioned to image a stack of items including a plurality of items, in the item container; a processor in communication with the imaging system, the processor configured to: receive the image of the one or more items in the item container from the imaging system; analyze the image to determine a dimension of the stack of items; determine a quantity of items in the plurality of items in the item container based on the determined dimension of the stack of items; and communicate the determined quantity of items to a facility information system.

In some embodiments, the system further comprises a reference measurement device.

In some embodiments, the reference measurement device is disposed on the container.

In some embodiments, the imaging system is positioned to capture an image the stack of items and the reference measurement device in a single image, and wherein the processor is configured analyze the image to determine the dimension of the stack of items based on the captured image.

In some embodiments, the reference measurement device is disposed on a surface of a facility proximate the item container.

In some embodiments, the imaging system is positioned at a prescribed distance from the shelf, and wherein the processor is configured to determine the dimension of the stack of items based on the prescribed distance from the shelf In some embodiments, the processor is further configured to analyze the received image to determine item identification information.

In some embodiments, the processor analyzes the received image to read a computer readable code on one of the plurality of items in the stack of items.

In some embodiments, the processor is further configured to receive item identification information, and to determine the quantity of items in the stack of items based on the identification information.

In some embodiments, the item information comprises at least one dimension of an item in the plurality of items.

In another aspect described herein, a method for automatically determining item quantity comprises capturing, in an imaging system, an image of a stack of items in a container; receiving, in a processor, the image of the stack of items in the item container from the imaging system; analyzing the image to determine a dimension of the stack of items; determining a quantity of items in the stack of items based on the determined dimension of the stack of items; and communicating the determined quantity of items to a facility information system.

In some embodiments, capturing an image of a stack of items in a container comprises capturing an image of a reference measurement device proximate the container.

In some embodiments, the reference measurement device is disposed on the container.

In some embodiments, capturing the image of the stack of items comprises capturing an image of a reference measurement device proximate the container comprises the reference measurement device in a single image.

In some embodiments, the reference measurement device is disposed on a surface of a facility proximate the item container.

In some embodiments, the imaging system is positioned at a prescribed distance from the shelf, and wherein analyzing the image to determine a dimension of the stack of items is based on the prescribed distance from the shelf In some embodiments, the method further comprises analyzing the received image to determine item identification information.

In some embodiments, the processor analyzes the received image to read a computer readable code on one of the plurality of items in the stack of items.

In some embodiments, the item information comprises at least one dimension of an item in the plurality of items.

In some embodiments, the method further comprises receiving, in a processor, item identification information, and wherein determining the quantity of items in the stack of items is based on the identification information.

DETAILED DESCRIPTION

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

An item distribution network generally desires to know the volume of items processed, received, sent to, shipped to or from, or otherwise related to each facility within the distribution network. Knowing the volume of items handled or processed at each facility can be used in establishing workloads and staffing, and can be used in managing runtimes, vehicles, and other equipment, providing analytics data, and for other desired features.

As used herein, the term "item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term "carrier" may refer to an individual assigned to a route who delivers the items to each destination. The term may also refer to other delivery resources, such as trucks, trains, planes, automated handling and/or delivery systems, and other components of the distribution network.

As described herein, a distribution network may comprise processing facilities such as regional distribution facilities, hubs, and delivery unit facilities, and other desired levels. For example, a nationwide distribution network may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or with many delivery unit facilities, and can sort and deliver items to the delivery unit facilities with which it is associated. In the case of the United States Postal Service (USPS), the delivery unit facility may be associated with one or more ZIP codes. The delivery unit facility receives items from local senders, and from hub level facilities or regional distribution facilities. The delivery unit facility also sorts and stages the items intended for delivery to destinations within the delivery unit facility's coverage area. The delivery unit facility may be associated with one or more delivery routes. A delivery route may comprise one or more route segments. As described above, sorting of the items occurs at each level in the network and thus improving sorting efficiency can affect the efficient operation of the distribution network generally.

In a distribution network, items for delivery are brought into facilities at many levels of the distribution network. At some levels of the processing facility, items are processed in preparation for the next stage in the delivery scheme. The sorting and transportation operations require resources, such as personnel, machines, equipment, etc. To accomplish item processing and handling, sorting and transportation, in an efficient and effective manner, it is advantageous to know item volumes and quantity. Some item volume information may be provided electronically, such as via an electronic manifest, or via another type of manifest. The manifests can have item information, such as origin, destination, delivery address, sender information, payment information, item size, item weight, and other desired attributes.

Sometimes items are provided to a facility in the distribution network without prior manifest data. This can happen, in the example of USPS, when a drop shipment from a bulk mailer is received, when a pallet or other container of flats is received, etc., at a receiving facility. Without manifest information, the volume of these items is unknown. One aspect of the present disclosure is related to automated systems for determining the volume or quantity of items for which prior manifest information is not received. One aspect of the present disclosure relates to measuring a quantity or volume of items received but not processed, such as when some portion of a manifested shipment is processed and some is delayed.

To determine piece counts and or item volume, a supervisor historically needed to physically measure the height, length, etc., of a stack of items. The length measurement can be converted to a item number by estimating, or by using a standardized conversion chart. Thus, the supervisor would estimate the number of pieces in a particular stack of items. This process, however, is time consuming, inefficient, and prone to error. An automated measurement utility can address the drawbacks of the manual measurement method, as described herein.

Piece count information can be useful for day-to-day management of distribution network facilities. In the case of the USPS items can be sorted or processed according routes or other geographic areas. Piece count information can be prepared or obtained on a route-by-route, area-by-area, facility-by-facility, or other basis.

Again using the USPS as an example, items, such as letters and flats may arrive at a unit delivery facility without being sequenced by mail processing equipment. These letters and flats may need to be "cased", that is, manually or automatically sorted into a case according to delivery point. The letters and flats may be stored on a rack, shelf, or other location prior to being cased, or if the letters or flats are not specifically addressed according to recipients at a delivery point, such as saturation mail.

An automated measurement utility can include an imaging device, such as a camera, scanner, etc., which can be mounted near a rack, shelf, or other location where items are stored in anticipation of processing, or which can be handheld, such as in a mobile computing device. The automated measurement utility can use the information from the imaging device to determine an item quantity or volume, and can store and use this information in a variety of other applications.

FIG. 1 depicts a block diagram of a system for an automated measurement utility. A central hub 100 can be a server or other computing device, and can comprise a processing unit 102, an image processor 130, a network interface 104, a computer readable medium drive 106, an input/output device interface 108, and a memory 110.

The network interface 104 can provide connectivity to one or more networks or computing systems within the distribution network. The processing unit 104 can receive information and instructions from other computing systems or services via the network interface 104. The network interface 104 can also store data directly to memory 110. The processing unit 102 can communicate to and from memory 110 and output information to an optional display via the input/output device interface 108. The input/output device interface 108 can also accept input from an imaging device 120.

The imaging device 120 can include an image capture component and a communication component. The imaging device can be in wired or wireless communication with the central hub 100. The imaging device 120 can be an optical or other imaging device configured to capture an image of items on a stack, and to determine a measurement associated with the stack, such as length, height, etc., and to provide image information to the central hub 100. Although the term stack is used herein, the groupings of items contemplated by the present disclosure can include arrangements of items other than a stack, such as a pile, a pallet, a sack, bin, bag, or other arrangement. These arrangements are all explicitly contemplated in using the term stack. In some embodiments, the imaging device can include one or more cameras, lenses, detectors, etc., positioned to capture a shortage area or stack or group of items from different or multiple angles. The image processor 130 can process the images obtained from the imaging device 120 in order to determine a measurement. The image processor 130 can store the processed image information in the memory 110.

The memory 110 may contain computer program instructions that the processing unit 102 executes in order to implement one or more embodiments described herein. The memory 110 generally includes RAM, ROM, and/or other persistent, non-transitory computer readable media. The memory 110 can store an operating system 112 that provides computer program instructions for use by the processing unit 102 or other elements included in the computing device in the general administration and operation of the central hub 100. The memory 110 can further include computer program instructions and other information for implementing aspects of the present disclosure.

A data store 122 can be external to the central hub 100 and can be in communication with the central hub 100. The data store 122 can store manifest information, including item information, like item identifiers item dimensions. The item information can be associated with the image of a stack of items, and the central hub 100 can determine stack measurements and item volume or quantity, as will be described elsewhere herein.

The elements included in the central hub 100 may be coupled by a bus 190. The bus 190 may be a data bus, communication bus, or other bus mechanism to enable the various components of the computing device 100 to exchange information.

In some embodiments, the computing device 100 may include additional or fewer components than are shown in FIG. 1. For example, a computing device 100 may include more than one processing unit 102 and computer readable medium drive 106. In some embodiments, two or more central hubs 100 may together form a computer system for executing features of the present disclosure.

Figure 2:
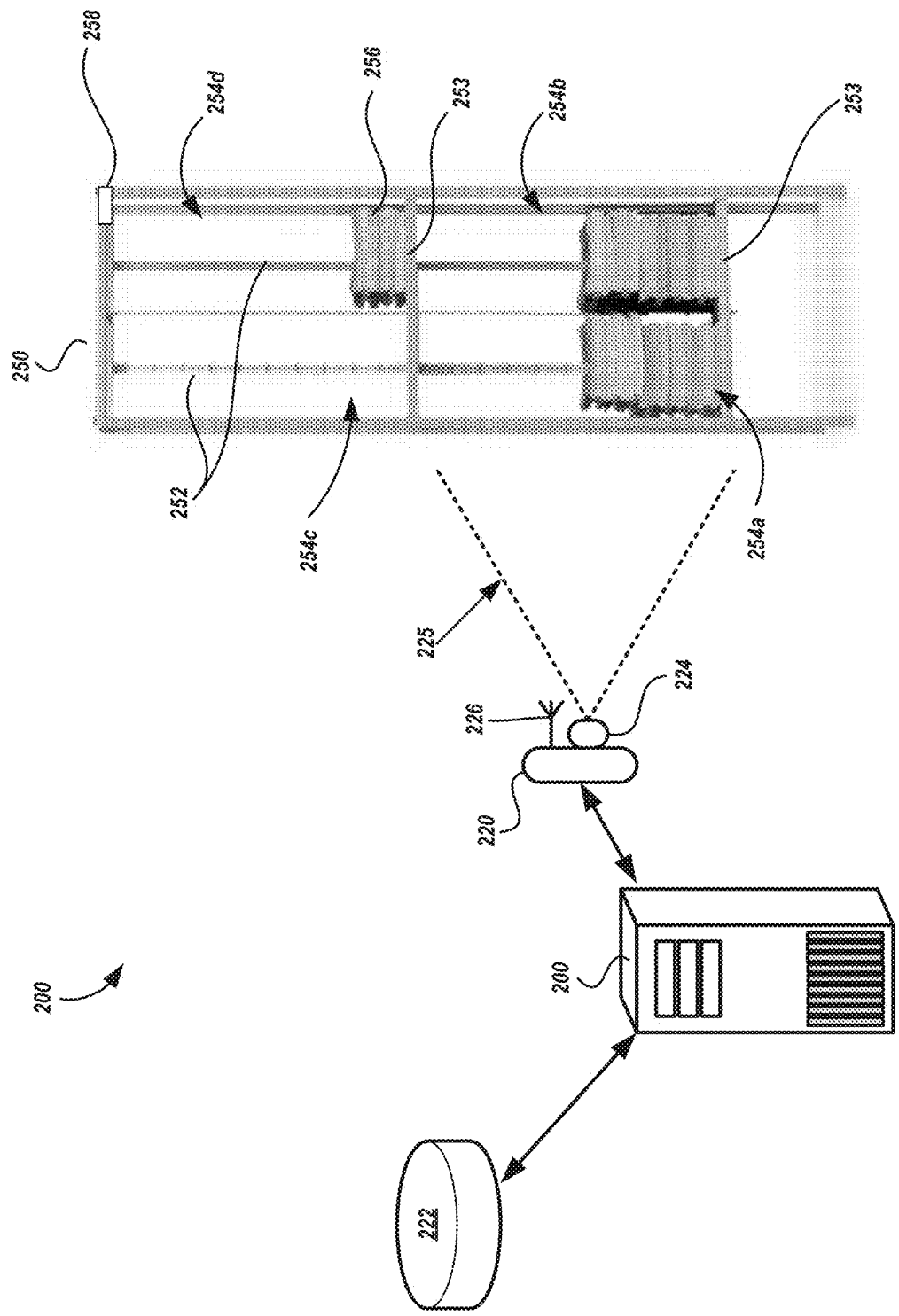
FIG. 2 depicts an exemplary system having rack or shelf for use in an automated measurement utility.

FIG. 2 depicts a system for an automated measurement utility. A system 200 includes a server 200, an imaging device 220, a data store 222, and a shelf 250. The server 200 is in wired or wireless communication with the imaging device 220 and the data store 222. The server 200 can be similar to other computing components, such as the central hub 100, described elsewhere herein. The data store 222 can be similar to data stores described elsewhere herein.

The imaging device 220 comprises an image acquisition device 224. The image acquisition device can be a camera, a lens, a transmitter, a laser barcode reader, an ultrasonic transducer, or other similar device that can emit and/or receive light or electromagnetic radiation, sound, etc., in order to image or sense a quality or property. The image acquisition device 224 has a field of view 225. The field of view 225 can be an area, section, portion, or field which is imaged by the imaging device. In some embodiments, more than one camera, lens, transmitter, etc., can be included in imaging device 220, in order to capture different angles, fields of view, and the like of the shelf 250 containing the items.

The image acquisition device 220 comprises a communication feature 226, which allows the image acquisition device 220 to relay a captured image or other information to the server 200. The image acquisition device 220 can be, for example, a mounted camera, a portable camera, or can be embodied in a mobile computing device, such as an employee or resource of the distribution network may carry.

The image acquisition device 220 is positioned, pointed, aimed, aligned, etc., with the shelf 250, in order to capture information about a stack of items 256 located on, near, around, or about the shelf 250. As depicted, the shelf 250 is a vertically arranged shelf having platforms 253 to receive one or more stacks of items 256 thereon. However, it is understood that the shelf 250 of the present disclosure can have a variety of shapes or configurations without departing from the scope of the preset disclosure. For example, the shelf 250 can be a horizontally arranged shelf where stacks of items 256 extend horizontally along a length of the shelf 250. The shelf 250, in some embodiments, can include or can be one or more bins, a pallet, can be an area of a floor in a distribution facility, a designated area against a wall, etc.

In some embodiments, the shelf 250 can be rolling stock, or movable container. In some embodiments, the container can be one such as can be directly loaded onto a vehicle. In some embodiments, the container can be on a vehicle and the mobile device of the supervisor can have the imaging device 220, and the supervisor can take automated measurements while the container is on a distribution network vehicle.

The shelf 250 includes four sections 254*a-d*. Each of the sections 254*a-d* can receive one or more stacks of items 256 thereon. In some embodiments, different types of items can be in the sections 254*a-d*. The shelf comprises a reference measurement device 252. In some embodiments, the reference measurement device can be a ruler, tape measure, or other similar device having delineations and markings thereon corresponding to set distances, with the reference measurement device 252 extending vertically in each, some, or all of the sections 254*a-d*.

The reference measurement device 252 can have a zero or initial measurement value indicated thereon at the platform 253, and can have an increasing measurement value as the reference measurement device 252 extends along a dimension of the shelf 250, or along a dimension of each of the sections 254*a-d*. As shown, the reference measurement device can extend from the platform, vertically along the height of the shelf 250.

The reference measurement device 252 can indicate units of length, such as centimeters, inches, feet, or any other desired measurement. In some embodiments, the reference measurement device 252 may have evenly spaced markings which do not indicate units, but which have known dimensions stored on the server 200, or in another location accessible by the server 200. In some embodiments, the reference measurement device 252 can be located on a floor or wall of a facility, for example, and a stack of items is positioned against the wall or on the floor in the area of the reference measurement device 252. In some embodiments, the reference measurement device 252 can be on a wall, floor or ceiling of a vehicle, such as on the vehicle trailer, with a container of items positioned with respect to the reference measurement device 252 on the trailer. In some embodiments, the reference measurement device 252 can be on a dock opening or door through which the shelf 250 or container of items will pass. As the container of items passes, the imaging device 220 can image the container and the reference measurement device 252 to determine a count of items on the container as described herein.

The imaging device 200 is configured to capture an image of the shelf 250, including the stack of items 256 on the platform 253 within one or more of the sections 254a. the reference measurement device 252 is located behind the stack of items 256 such that the topmost item in a stack of items 256 will correlate to some height or distance on the reference measurement device. In some embodiments, the reference measurement device can be located on a side portion of the shelf 250, and need not be located behind the stack of items 256.

The image capture device 220 will transmit the captured image to the server 200 for processing and determination of the quantity or volume of items 256 in the stack of items 256 depicted in the image, as will be described elsewhere herein.

In some embodiments, the shelf 250 does not include a reference measurement device. In this case, the imaging device 220 and/or the server are configured to determine a height of the stack of items 256 via image analysis processes, using known values. For example, the server 200 may store information regarding the size of the shelf 250, the size of the quadrants 254a-d, the location of the imaging device 220 relative to the shelf 250, and image characteristics, such as pixel density, resolution etc., which can be used to determine a measurement value for the stack of items 256, as will be described elsewhere herein.

In some embodiments, the stack of items 256 is a homogenous stack, where all the items in the stack of items 256 are of the same type, and have generally the same, or identical dimensions. This may be the case where there is saturation mail, bulk mail, magazines, catalogs, or other flats, which are to be sorted and delivered to each route serviced by a distribution facility. In some embodiments, the stack of items 256 is a heterogeneous stack, where the items in the stack of items 256 are not all of the same size or dimensions. This can occur if multiple types of items are placed on the shelf 250, for example, as an overflow volume or as items that arrived too late to the distribution facility to be cased or sorted to delivery points within a route, and are being held until the next casing or sorting activity occurs.

In some embodiments, if different types of items are stacked or placed on a shelf, a divider or other device can be placed on the first type of items before the second type of item is placed on the shelf 250. The divider can have a high contrast color pattern or can have distinctive coloration, shape, size, or other characteristic that can be identified or recognized the image analysis software in the server 200 as a delineation or boundary between item types.

In some embodiments, each or a sub-combination of sections 254a-d of the shelf 250 may have a different type of item thereon. That is, in section 245a and 245b there may be a first type of item in the stack of items 256, in section 245c there may be a second type of items in the stack of items 256, and in section 254d, there may be a third type of item in the stack of items 256. The imaging device can image all or some of the sections 254a-d in a single image, and the server 200 can analyze the image to determine quantities for stacks of items 256 in all or some of the sections 254a-d.

The shelf 250 can include a shelf identifier 258. The shelf identifier 258 can be a computer readable code, an RFID tag, or other similar device that uniquely identifies the shelf 250. The shelf identifier 258 can be positioned on the shelf 250 so as to be in the field of view 225 of the image acquisition device 220, and can to be included in an image acquired by the image acquisition device in order to identify the shelf 250 being imaged, for example, in a facility where there are a plurality of shelves 250. The imaging device can image the shelf identifier 258 to access, via the processor, information about the shelf, including location, dimensions, etc.

In some embodiments, the imaging device can have a field of view such that the top of the stack of items on the shelf 250 is visible to the camera. In some embodiments, the imaging device 220 can include a camera positioned with a field of view including the edges of items in a stack of items and reference measurement devices 252, and a camera positioned with a field of view including a top of the item stack. The imaging device can image the top item in a stack of items to determine dimensions of item in two directions, and can identify the specific item, such as by recognizing the image, recognizing standardized markings (such as priority mail envelopes), or by reading a computer readable code on the item. The processor 200 can receive the item images, identify a specific item using image analysis to recognize the item, and obtain item information for the item. The item information can include dimensions, such as item measurements in 3 dimensions, item weight, and other information. In some embodiments, a stack of items may have a label thereon, such as a pallet of items, that identifies the item type and which allows the server 200 to obtain item dimensions. In some embodiments, the item dimensions can be encoded into a computer readable code on an item or on the stack of items, or on the shelf 250 or container.

Figure 3:
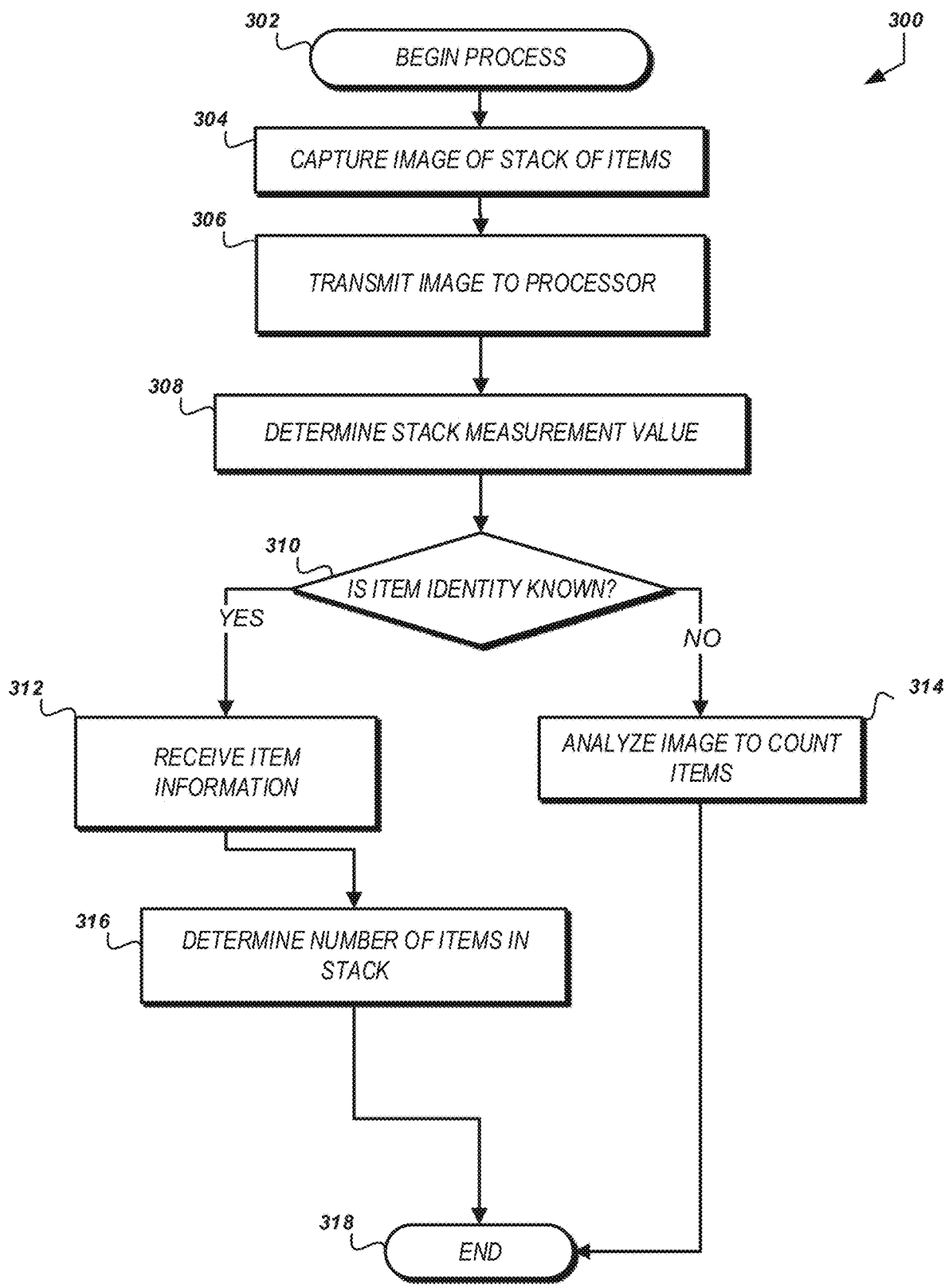
FIG. 3 is a flow chart showing an exemplary process for determining item volume or quantity.

FIG. 3 is a flow chart depicting an exemplary process for an automated measurement utility. A process 300 begins at step 302. The process 300 moves to step 304, wherein the image acquisition device 220 acquires one or more images of the shelf 250 having one or more stacks of items 256 thereon. These images can include the reference measurement device 252.

The process 300 moves to step 306, wherein the image processing device 220 transmits the captured one or more images to the server 200. The process 300 moves to step 308, wherein the server analyzes the received image using image analysis tools, to determine a stack measurement value. In some embodiments, for example, where the shelf 250 comprises a reference measurement device 252, the server 200 analyzes the image to identify which value on the reference measurement device corresponds to a top surface of the stack of items. For example, the server analyzes the image, which includes an image of the reference measurement device 252, to determine that the top of the stack of items 256 corresponds to a measurement of 33 inches (or other measurement) using the markings on the reference measurement device 252 corresponding to the top of the stack of items 256. Thus, the server 200 can determine that the stack of items 256 is 33 inches tall. In some embodiments, the server 200 can make a similar determination for a stack of items 256 in each of the sections as described above.

In some embodiments, for example, where the shelf 250 does not include a reference measurement device, the server 200 can analyze the image of the stack of items using image analysis algorithms to determine the height of a stack of items. For example, the server 200 can use an edge detection algorithm to determine where the bottom and top of the stack of items 256 are in the image. Using known values, such as camera distance from the stack, image resolution, the server 200 can determine the height of the stack, for example, by counting pixels having a known corresponding distance for each pixel. In some embodiments, the server 200 can use other calculation methods, for example, scaling the image, etc., to determine the height of the stack of items. As an example, the server 200 can analyze the image of the stack of items 256 to determine that the stack of items 256 is 33 inches tall.

In some embodiments, the server 200 can analyze the image using edge recognition, pattern recognition, or the like, to determine whether the stack of items is a homogeneous stack or a heterogeneous stack of items.

In some embodiments, the server 200 can analyze the image for any identifying features on the top item in the stack, or end item in the stack, based on the orientation of the stack. For example, the image acquisition device may be placed at an angle relative to the vertical or horizontal direction of the stack, in order to allow the image acquisition device 220 to see or image the topmost item or endmost item in the stack, or the imaging device can include multiple cameras. The server 200 will analyze the item in the stack to identify whether there is a computer readable code thereon, such as a barcode, QR code, etc. In some embodiments, the server 200 can analyze the image to determine distinguishing features or unique features on the topmost or endmost item in the stack of items 256.

The process 300 moves to decision state 310, wherein the server 200 determines whether the item identity is known. This can be done, for example, by interpreting the computer readable code on the item, or by analyzing the image of the topmost or endmost item, and querying the data store 222 for item information for items associated with or corresponding to the computer readable code or the image of the topmost or endmost item. For example, if the server 200 can identify and read a computer readable code, the server 200 queries the data store 222 using the computer readable code, and can receive item information from the data store which can include, for example, item dimensions. The same process can occur to recognize other features or details of the topmost or endmost item in the stack.

In some embodiments, for example, where a computer readable code or image is not recognized, the server 200 can query the data store 222 with a request to obtain item information for the items on the shelf 250. The server 200 can analyze the image of the shelf 250 to read the shelf identifier 258. The server 200 can send the shelf identifier 258 to the data store 222, and the data store 222 can return information about the items on the shelf 250 having the shelf identifier 258. The item information for the items in the stack of items 256 on the shelf 250 corresponding to the shelf identifier 258 can be sent to the server 200.

In some embodiments, the server 200 can identify or receive in the image data an identifier for the image acquisition device 220 which transmitted the image of the shelf 250. In the case where cameras are fixed or mounted near the shelf 250, the server 200 can know, based on a stored map of the distribution facility, the identity of the shelf 250 being imaged. For example, the server 200 can determine from the identifier of the image acquisition device, which shelf 250 of a plurality of shelves 250 in a distribution facility is being imaged. In some embodiments, one image acquisition device can have a movable field of view such that the image acquisition device 220 can image more than one shelf 250 by moving its field of view 255. The position or aim of the image acquisition device 220 can be transmitted to the server along with an identifier of the image acquisition device 220 and the image of the shelf 250. Using the position or aim or field of view data and the image acquisition device identifier, the serve 200 can identify which shelf 250 in a distribution facility is being imaged.

The server 200 can query the data store using this information in order to obtain item information for the items on the shelf 250.

In some embodiments, for example, where a supervisor is walking around a facility taking images of a plurality of shelves 250 within the distribution facility using a mobile computing device, the location of the mobile computing device can transmit or send its location information along with the image. In some embodiments, the location information for the image can be sent to the server 200 or to another component of the distribution network system separately from the image. The distribution network can have a location detection system within the distribution facility where the shelves 250 are being imaged. The system can identify the location of the mobile computing device when the image was taken, and the server 200 can use this information to determine which shelf 250 is being imaged, based on known locations of the shelves 250 in the distribution facility.

A supervisor may walk around and image the shelves 250 at intervals, such as at specified times of day, after a sorting or processing operation has finished, the beginning of a shift, etc. In one example, a supervisor can track progress of item sorting, processing, handling, casing, etc., by imaging a shelf 250 at the beginning of shift, and at some point later in the shift, and the server can determine how many items are processed per unit time. Tracking item processing progress can also be accomplished by taking and analyzing images of the shelves 250 in a facility at regular intervals.

Information regarding which items are stored on various shelves 250 can be generated and stored by other systems in the distribution facility, such as when a container or pallet of items is being unloaded, and association between the items and the shelf 250 may be stored. The information can be stored in the data store, or in another location accessible to the server 200, as the shelves are loaded, or during other operations throughout the distribution facility. The data store 222 may pull relevant information from other networked systems of the distribution network in order to obtain the information.

If the item identity on the shelf 250 is known, as described above, the process 300 moves to step 312, wherein the server 200 receives the item information. For example, the data store 222, or another system, sends, in response to the query, item information for the items associated with the shelf 250 which was imaged.

The process 300 moves to step 316, wherein the server 200 determines the number of items in the stack of items 256. The server uses the determined height of the stack of items 256, and uses the known item dimension to determine how many individual items are in the stack of items. For example, the item information can include information that the items on the shelf 250 are each one-quarter (¼) inch tall. The server then determines that in the 33 inch tall stack of items are 132 individual items. These values are exemplary only.

In some embodiments, the item information can include an item weight, item material, such as paper, cardstock, heavy paper, etc., which can be used by a compression algorithm in the server. For example, in a vertical stack of items 256, the items at the bottom of the stack will compress due to the weight of the items above, which will cause the items lower in the stack to have a smaller height dimension that the nominal item thickness received from the data store 222. For example, an item at the bottom of the stack of items that has a nominal one-quarter inch height may compress to 7/32 inch or 3/16 inch, or to another value, depending on the weight of items or number of items above. The server 200 can execute a compression algorithm where the server 200 uses the height of the stack to determine whether to apply a compression factor to the resulting number of items. in some embodiments, the server 200 can use the height of the stack and the density or weight of the individual items to develop a compression factor to apply to the count of items.

For example, if the nominal count of items in a 33 inch tall stack is 132, as described above, a compression factor can be applied to the nominal count of 132. Depending on the factors above, the compression factor can be 1.01, 1.02, 1.1, or another factor. After applying the compression factor, the server 200 may determine that the nominal count of 132 should be adjusted by a compression factor of 1.02 for an actual count of 135 (rounding up), or another number based on the compression.

The process above can be repeated for each section 254a-d in the shelf 250. The number of items in the stacks of items 256 in the sections 254a-d can be summed and a total item count for the shelf 250 can be determined. The item count for the shelf 250 can be stored in a memory, such as in a data store, to be used and/or accessed later.

In embodiments where a single stack includes items of different dimensions, the imaging system 220 can identify the location/height of the high contrast dividers and can generate a quantity for each different type of item as described herein.

The process 300 moves to step 318 and ends.

If the identity of the items is not known in decision state 310, for example, the data store 222 does not have any information for the items on the shelf 250, the process moves to step 314, wherein the processor estimates the item count. Additionally, if the stack of items is heterogeneous, using item information for the top item may not provide an accurate item count. Estimating the item count can be done using a conversion factor. For example, a 33-inch tall stack of items can be converted to an item quantity using nominal item dimensions, average piece height, or based on other factors, such as the number of delivery stops along a route. If a stack is letters, the server 200 can determine that, on average, there are 200 letters per foot. If a stack is composed of flats, the server can determine that, on average, there are 115 flats per foot. So, for a 33-inch tall stack of flats, at 115 flats per foot, the server 200 will determine that the stack contains 316 items.

In some embodiments, the server 200 can perform image analysis and edge detection to count the number of items in the stack. The server 200 can identify in the image of the stack of items a delineation or transition indicator between items, such as a specific color or feature re-occurring at regular intervals in the image of the stack of items. The server 200 can identify distinct patterns in the image, or a repeating pattern that can correspond to the transition between one item and another within the stack of items 256. The server can count the number of transitions to generate a count of items. In some embodiments, the server 200 can use other image analysis methods to count individual pieces within the stack of items 256.

In a heterogeneous stack, if dividers have been used, the server 200 can identify the dividers within the image and determine how many of each different type of item is in the stack of items 256 as described herein. In some embodiments, the dividers can have a code thereon which can be imaged and read by the server 200, and which can be used to identify the items underneath, below, or by the divider.

The process above can be repeated for each section 254a-d in the shelf 250. The number of items in the stacks of items 256 in the sections 254a-d can be summed and a total item count for the shelf 250 can be determined. The item count for the shelf 250 can be stored in a memory, such as in a data store, to be used and/or accessed later.

The process moves to step 318 and ends. The process 300 can be performed multiple times, for example, can be performed once for each shelf 250 in a distribution facility. The server 200 can store the individual shelf 250 item volumes or quantity, and the server can aggregate or sum the item volumes or quantities from all or any combination of the shelves in a distribution facility.

Figure 4:
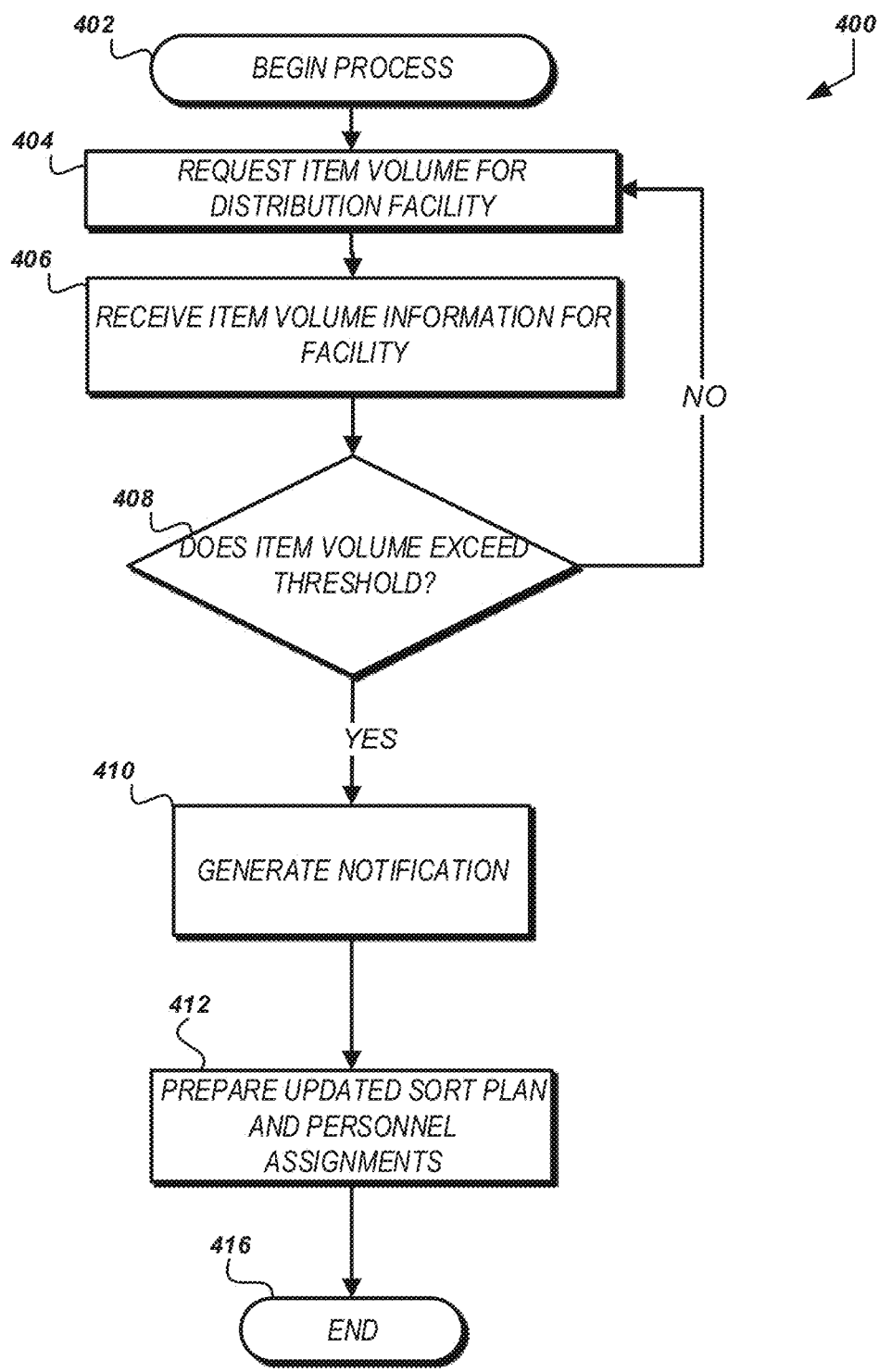
FIG. 4 is a flow chart showing an exemplary process for using item volume or quantity information.

FIG. 4 depicts a process using an automated measurement utility. A process 400 begins in step 402 and moves to step 404, wherein a request for item volume for a particular distribution facility is received. The request can be received from a facility supervisor desiring to know the current volume at a facility, an overflow volume, for various purposes. The request can be received from an inventory management program that requests inventory updates at intervals, such as at a periodicity, at the beginning of a shift, prior to preparing a sorting or operational plan for a facility, etc. The information can be used to evaluate performance and to anticipate processing equipment runtime, resource run time for sorting and/or casing items, and to predict resource requirements, and as an input into a facility daily operation plan.

In some embodiments, requesting item volume can comprise initiating the process of FIG. 3. This can be performed on demand by a supervisor imaging shelves 250, or by instructing the fixed or mounted image acquisition devices 220 throughout the facility to image the shelves 250. In some embodiments, the process of FIG. 3 can be performed at a set periodicity, or in conjunction with certain events.

In some embodiments, the request can occur as part of an automated program configured to update item volumes in real-time, near real-time, or at another time. A supervisor or automated program can request item volume information via a user interface in communication with the server 200. In some embodiments, the supervisor can request item volumes for the entire facility, such as item volume on all the shelves 250 within the facility. In some embodiments, the supervisor or automated program can request item volumes for sub-portions of the facility. For example, the item volume information can be requested for a single route, for a group of routes, for items intended for transportation to a specific geographic area, and the like.

In some embodiments, a regional supervisor with responsibility for several other distribution facilities can request the item volume information for one or more of the distribution facilities reporting to or within the purview of the regional supervisor.

The process 400 moves to step 406, wherein the requested item volume is received, for example, via a user interface, via an electronic message, and the like, from the serve 200 and/or the data store 220, depending on where the item volume or quantity information was stored.

The process 400 moves to step 408, wherein it is determined whether an item volume exceeds a threshold. The threshold can be a number of items, either total, or per route, which can be processed or serviced without deviation or change from a base line or normal sort plan or resource requirement. In some embodiments, the threshold can be a single value set for an entire facility, or an individual value for each route or operational area of a facility. In some embodiments, the threshold value can be set at different levels for various routes or areas of the distribution facility. For example, one route, or one section of the distribution facility may routinely receive, process, or handle more items and/or more delivery points than a different route or section of the facility. In this case, the threshold value for the routes or sections associated with higher item volumes may have a threshold value set at a higher level than routes or sections associated with lower item volumes.

If the item volume does not exceed the threshold value, the process 400 returns to step 404, wherein item volumes are requested. If the item volume does exceed the threshold value, the process 400 moves to step 410, wherein a notification is generated. The notification can be provided as part of an automated routine checking item volumes. The notification can be an email, text, alarm, audio or visual signal, etc., to a supervisor. In some embodiments, the notification can be a signal sent to a module, routine, or process running in the server 200, which triggers action to be taken by the automatic system.

The process 400 moves to step 412, wherein an updated sort plan and personnel assignments are prepared. In some embodiments, preparing an updated sort plan includes requesting and/or allocating more or less time on a particular piece of item processing equipment based on the item volume. In some embodiments, updating the sort plan can include rerouting one or more items or containers to a different location within the facility or rerouting incoming items intended for a first facility to a second facility. One of skill in the art, guided by this disclosure, will understand other steps that can be taken as part of updating a sort plan.

In some embodiments, resource availability is determined. If the item volume exceeds the threshold, the server 200 may re-allocate resources, such as employees or operators, equipment runtime, or other resource within the facility to address the item volume. In some embodiments, the server 200 may request additional resources be provided, that work schedules be lengthened or altered, that additional vehicles are dispatched, and the like, in order to ensure sufficient personnel are available to receive, handle, sort, case, or otherwise process the items.

The process 400 moves to step 416 and ends.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM) , registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some implementations, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for automatically determining item quantity comprising:
    an item container having a reference measurement device disposed thereon, the reference measurement device comprising measurement markings disposed on the container at regular intervals;
    an imaging system positioned to image a stack of items in the item container, the stack of items extending along a measurement direction of the reference measurement device, wherein the imaging system is positioned to capture, in a single image, the stack of items and the reference measurement device;
    a processor in communication with the imaging system, the processor configured to:
        receive the captured single image of the one or more items in the item container from the imaging system;
        analyze the captured single image to determine a dimension of the stack of items based on the relative position of the stack of items and one or more of the measurement markings on the reference measurement device;
        determine a quantity of items in the plurality of items in the item container based on the determined dimension of the stack of items; and
        communicate the determined quantity of items to a facility information system.

2. The system of claim 1, wherein the container comprises a first section and a second section, and wherein the first section has a first reference measurement device thereon and the second section has a second reference measurement device thereon.

3. The system of claim 1, wherein the imaging system is positioned at a prescribed distance from the shelf, and wherein the processor is configured to determine the dimension of the stack of items based on the prescribed distance from the shelf.

4. The system of claim 1, wherein the processor is further configured to analyze the received image to determine item identification information.

5. The system of claim 4, wherein the processor analyzes the received image to read a computer readable code on one of the plurality of items in the stack of items.

6. The system of claim 1, wherein the processor is further configured to receive item identification information, and to determine the quantity of items in the stack of items based on the identification information.

7. The system of claim 6, wherein the item information comprises at least one dimension of an item in the plurality of items.

8. A method for automatically determining item quantity comprising:
    capturing, in an imaging system, an image of a stack of items in a container and a reference measurement device, the reference measurement device being disposed proximate the container, and wherein the stack of items extends along a measurement direction of the reference measurement device;

receiving, in a processor, the image of the stack of items in the item container from the imaging system;

analyzing the image to determine a dimension of the stack of items;

determining a quantity of items in the stack of items based on the determined dimension of the stack of items; and communicating the determined quantity of items to a facility information system.

9. The method of claim 8 wherein the reference measurement device comprises measurement markings disposed at regular intervals thereon.

10. The method of claim 9, wherein capturing the image of the stack of items comprises capturing an image of the reference measurement device and the measurement marking disposed thereon.

11. The method of claim 8, wherein the container comprises a first section and a second section, the first section having a first reference measurement device disposed thereon and the second section having a second reference measurement device disposed thereon, and wherein capturing the image of the stack of items comprises capturing a first image of a first stack of articles in the first section and capturing a second image of a second stack of articles in the second section.

12. The method of claim 8, wherein the imaging system is positioned at a prescribed distance from the shelf, and wherein analyzing the image to determine a dimension of the stack of items is based on the prescribed distance from the shelf.

13. The method of claim 8, further comprising analyzing the received image to determine item identification information.

14. The method of claim 13, wherein the processor analyzes the received image to read a computer readable code on one of the plurality of items in the stack of items.

15. The method of claim 14, wherein the item information comprises at least one dimension of an item in the plurality of items.

16. The method of claim 8, further comprising receiving, in a processor, item identification information, and wherein determining the quantity of items in the stack of items is based on the identification information.

17. A system for automatically determining item quantity comprising:

an item container having a reference measurement device disposed thereon, the container comprising a first section and a second section, wherein the first section has a first reference measurement device thereon and the second section has a second reference measurement device thereon;

an imaging system positioned to image a stack of items including a plurality of items, in the item container, the stack of items extending along a measurement direction of the reference measurement device;

a processor in communication with the imaging system, the processor configured to:

receive the image of the one or more items in the item container from the imaging system;

analyze the image to determine a dimension of the stack of items;

determine a quantity of items in the plurality of items in the item container based on the determined dimension of the stack of items; and communicate the determined quantity of items to a facility information system.

* * * * *